United States Patent [19]

Hicks

[11] Patent Number: 5,093,682
[45] Date of Patent: Mar. 3, 1992

[54] DEVICE FOR MARKING PHOTOGRAPHIC PRINTS

[76] Inventor: Ray Hicks, 2605 Corunna Rd., Flint, Mich. 48503

[21] Appl. No.: 640,274

[22] Filed: Jan. 10, 1991

Related U.S. Application Data

[63] Continuation-in-part of Ser. No. 466,156, Jan. 17, 1990.

[51] Int. Cl.⁵ ............................................. G03B 27/00
[52] U.S. Cl. ..................................................... 355/1; 355/41
[58] Field of Search .................. 355/39, 40, 41, 1; 352/92

[56] References Cited

U.S. PATENT DOCUMENTS

| | | | |
|---|---|---|---|
| 3,029,717 | 4/1962 | Hildebrandt | 355/1 |
| 3,987,467 | 10/1976 | Cowles | 355/40 |
| 4,553,833 | 11/1985 | Kanaoka et al. | 355/1 |
| 4,854,696 | 8/1989 | Guez | 355/40 |

Primary Examiner—Monroe H. Hayes
Attorney, Agent, or Firm—Krass & Young

[57] ABSTRACT

An apparatus for marking data on photographic prints being made in a photographic printing machine comprises an LED/fiber optic dot-matrix printing device mounted within the printing machine. Data corresponding to the prints being made is entered via a keyboard and converted into a series of dot-matrix light patterns on said LED array, which patterns are then transmitted to a marking head mounted adjacent the path of the printing paper through the machine by way of a plurality of optical fibers.

13 Claims, 3 Drawing Sheets

DEVICE FOR MARKING PHOTOGRAPHIC PRINTS

RELATED APPLICATIONS

This application is a continuation-in-part of Ser. No. 466,156, filed Jan. 17, 1990, for Device for Marking Photographic Prints.

FIELD OF THE INVENTION

This invention relates to apparatus for marking data on photographic print paper as it is being processed, and more specifically to a light source/fiber optic dot-matrix film marking device mounted in a printing machine for marking the print.

BACKGROUND OF THE INVENTION

In the photographic film processing industry it has long been recognized as desirable to mark the prints resulting from the development and processing of a batch of film with identification and/or processing data. This is typically done prior to or during the development and processing of film. A well-known prior art method for marking prints with data is to photograph alphanumeric data directly onto the film within the camera itself as the film is exposed or, alternately, within the developing/processing machine. Prints made from film so marked will accordingly display the data superimposed on the film image. The alphanumeric data is typically photographed onto the film by a light emitting diode (LED) array disposed near the film within the camera or in the developing/processing machine, which array can be selectively activated to generate various alphanumeric light characters in a well-known manner.

Another method has been to shine light through an opaque stencil directly onto the printing paper in the dark room during the exposure process.

U.S. Pat. No. 4,361,388 to Micak et al, relates to a LED/fiber optic apparatus for marking data directly on a frame of film as it is exposed in the camera. A pedestal mounted on a plate in the camera housing supports an array of LED elements arranged in such a manner that a number of alphanumeric characters can be displayed by selectively lighting various portions of each element in the array. A microprocessor incorporated within the camera operates the LED elements to display a set of characters corresponding to a particular frame of film being exposed. Fiber optic bundles overlying the LED elements transmit the characters displayed by the LED elements onto a frame of film, thereby permanently providing the frame with identifying data.

U.S. Pat. No. 3,987,467 to Cowles, relates to a system for marking previously exposed film with data while it is being processed in an automated machine prior to the making of prints therefrom, and simultaneously printing the data on a label or envelope corresponding to the film being marked. A continuous strip of film being fed into the machine is marked with data by an LED array whose light is focused onto the film by way of a system of lenses. The signal which activates the LED array is simultaneously sent to a printer, which prints the data on an envelope corresponding to that film. As an alternate embodiment, the Cowles patent teaches that other suitable means could be used to apply the data to the film, such as a fiber optic dot array or other illuminated display means, in place of the light source assembly.

U.S. Pat. No. 4,193,684 to Armstrong, relates to an apparatus for marking photographic negatives or prints with identifying data in the dark room. A contact printer enclosed in an opaque housing is placed over the film negative or print and a timed lamp is energized to project light through a light masking element or stencil to create a light image on the print.

An inherent disadvantage in marking the film itself is that the data marked thereon is permanent and will accordingly appear on every print resulting therefrom. It is therefore not possible to produce a print from the marked film negative without that data, or with any change in the data. A disadvantage inherent to contact printer lamp/stencil apparatus for forming light images on prints is the need for a change of stencils or masking elements each time a different set of data is to be marked on the print.

SUMMARY OF THE INVENTION

The present invention is an light source/fiber optic print marking apparatus for use in a photographic print processing machine. Prints being made from developed film in the machine are exposed by light transmitted from an LED or other light source array through fiber optics in a dot-matrix pattern, resulting in the marking of data on the margin of finished prints.

In the illustrated embodiment, an LED or other light source array is oriented with first ends of a matching array of optical fibers to receive the light generated. The optical fibers are connected at their opposite end to a printing head mounted adjacent the path of the film in the printing machine. A microcontroller and associated components in the printing machine selects alphanumeric data corresponding to each print or set of prints and activates the LED or other light source array, thereby transmitting a pattern of light through the optical fibers to the printing head and onto the printing paper.

In a preferred embodiment, the LED or other light source array and corresponding optical fibers are arranged in a single-row dot matrix pattern. An RS232 decoder interface connected to the microcontroller and the LED or other light source array receives the data from the microcontroller and converts it to a sequence of dot-matrix signals which together represent an alphanumeric character or string of characters. The signals are then transmitted to the LED or other light source array where they selectively enable the individual light sources in the array in the appropriate pattern. This pattern is then transmitted through the optical fibers to the printing head, which directs the pattern onto the printing paper in dot-matrix form.

The photographic paper remains stationary during the exposure process. Therefore, the printing head operates to move with respect to the paper and a expose the dot-matrix pattern on the margin thereof. By moving the printing head and intermittently illuminating successive single-row dot patterns, a series of spaced patterns creates a dot-matrix character, or string of characters, in a manner similar to a dot-matrix printer.

The use of fiber optics to transmit the light from the LED or other light source array to the print increases the clarity and sharpness of the data marked on the print. The single-row dot-matrix array and printing method substantially reduces the number of optic fibers required for clear, complete transmission of the data from the LED or other light source array to the film, simplifies the LED or other light source array structure, and lends itself well to printing continuously onto the moving print paper surface. Also, the use of optical fibers to transmit the light pattern generated by the LED or other light source array to the printing head and onto the printing paper permits the LED array itself to be positioned remotely from the printing location.

Other features and advantages of the present invention will become apparent upon further reading of the specification.

BRIEF DESCRIPTION OF THE ILLUSTRATED EMBODIMENT

DETAILED DESCRIPTION OF THE ILLUSTRATED EMBODIMENT

Figure 1:
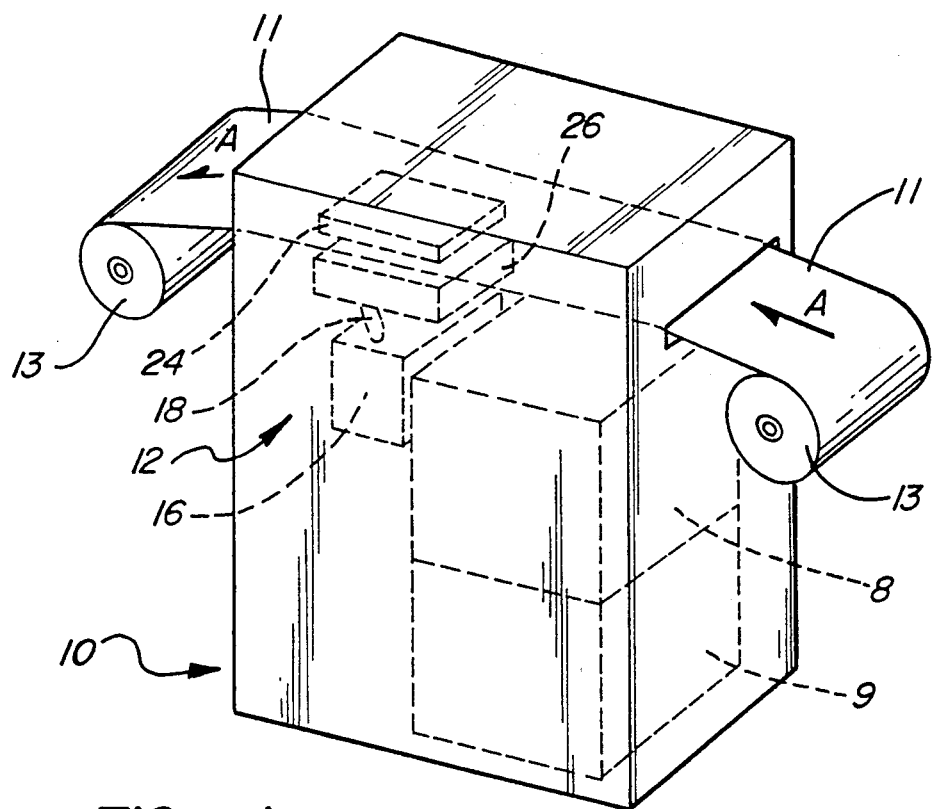
FIG. 1 is simplified perspective view of a photographic printing machine incorporating a light source/fiber-optic marking device according to the present invention.
Figure 2:
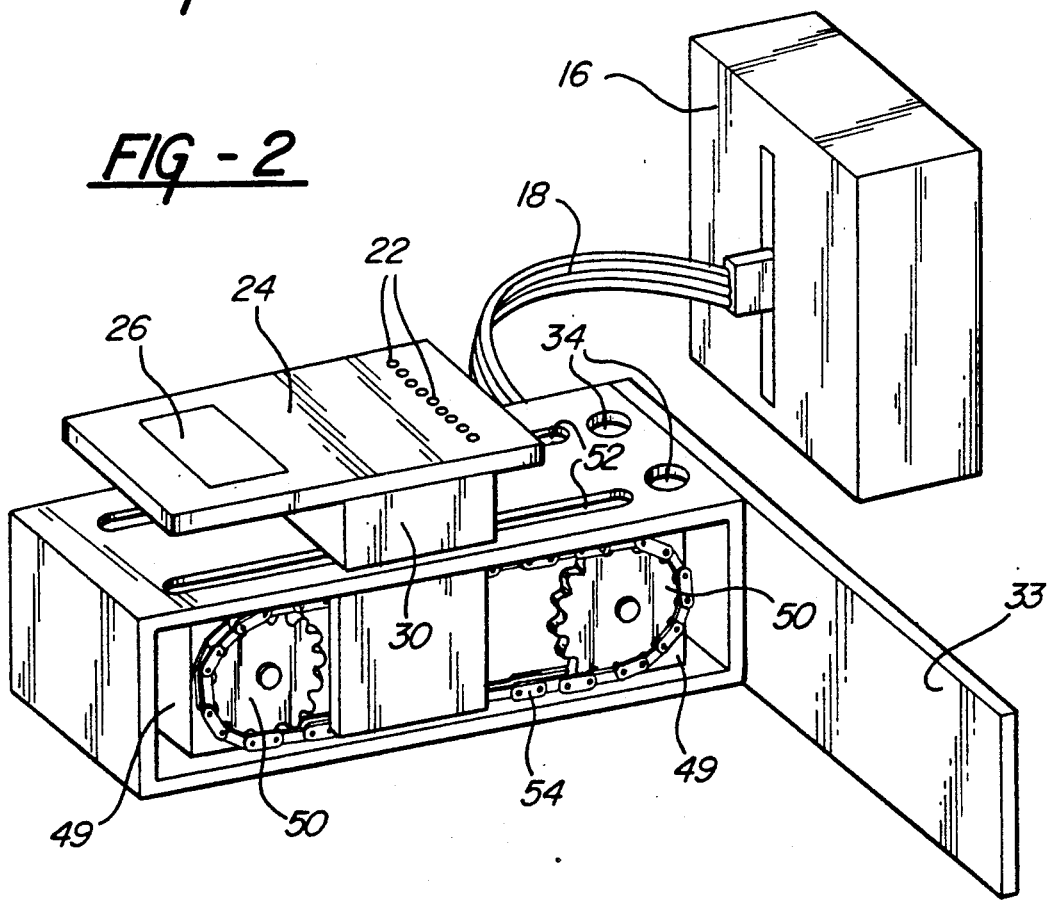
FIG. 2 is a perspective view of the light source/fiber-optic marking device according to the present invention.
Figure 3:
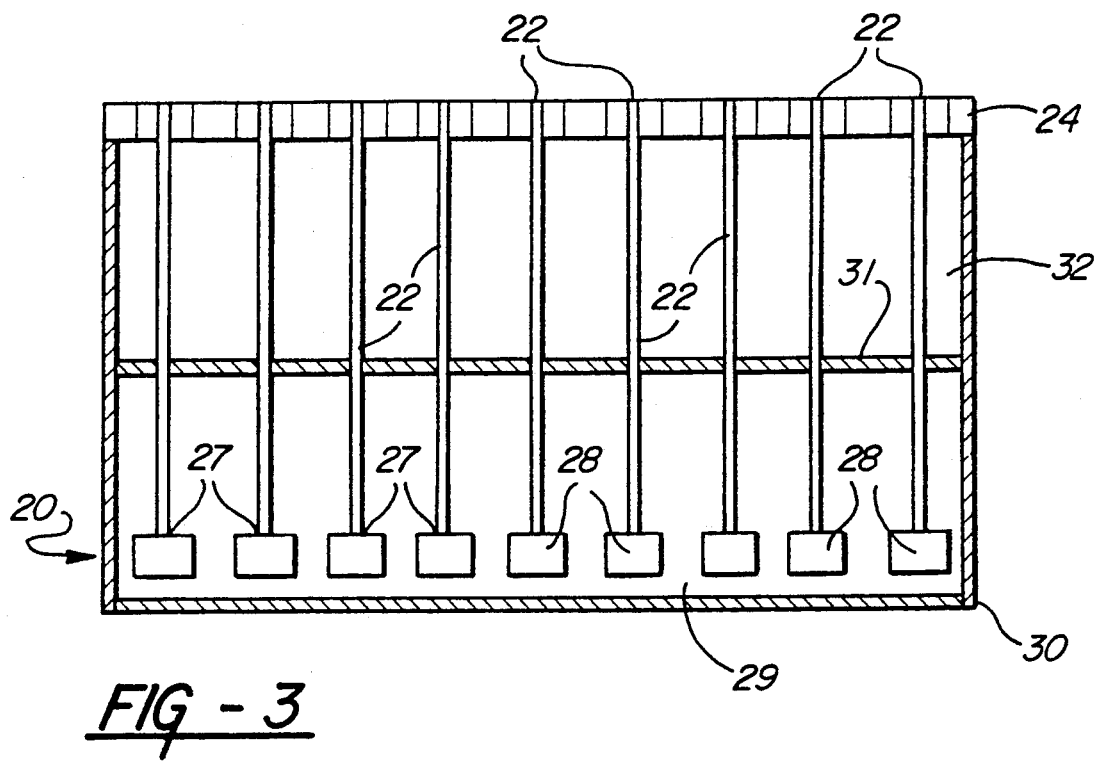
FIG. 3 is a section end view of a dot-matrix fiber-optic marking head according to the present invention.

Referring now to FIGS. 1-3, a commercial automated photographic printing machine 10 produces finished prints from a roll of developed film in a manner well-known in the art is shown. Printing machine 10 generally includes at least one lens array 8, and negative exposure equipment 9 to systematically expose the photographic paper 11 as it moves through the printing machine 10.

Enclosed within the housing of printing machine 10 is a LED/fiber optic marking system 12. The optical marking system 12 comprises a microcontroller 16, an RS232 interface 18, a light emitting diode (LED) array 20, a plurality of optical fibers 22 and a optical marking head 24.

Referring particularly to FIGS. 2 and 3, LED array 20 comprises a plurality of individual co-planer LEDs 28, enclosed within a cavity 29 in opaque housing 30. Each LED is independently capable of producing a point of light at light emitting end 27 when enabled by a suitable current source (not shown). The light emitting ends 27 of LED array 20 are adjacent an opaque partition 31 separating a second cavity 32 from cavity 29. The ends of a plurality of optical fibers 22 are securely mounted in cavity 32, and extend through apertures in partition 31 such that the end of each optical fiber is positioned adjacent one of LEDs 20 to receive and transmit light therefrom. Each optical fiber is sealed in an individual aperture in partition 31 to prevent light from leaking from cavity 29 between the optical fibers and the walls of the apertures.

The opposite ends of optical fibers 22 are mounted in marking head 24 in a single-row, co-planar array as shown in FIG. 2. Light produced by an individual LED 20 in housing 30 is transmitted through a corresponding optical fiber 22 to marking head 24, where it is projected from the end of the fiber as a sharply defined point of light.

It will be understood that the array of LEDs 20 in housing 30 may be arranged in any order, since flexible optical fibers 22 can be bent, twisted and generally rearranged to be arrayed in the dot-matrix pattern shown in FIG. 2. At least one optical fiber 22 is provided for each element in the LED array 20.

A continuous roll of printing paper 11 is fed by rollers 13 past marking head 24 in direction A. In this illustrated embodiment, printing paper 11 has already been exposed to or sensitized with a number of images from a roll or strip of film negatives in another portion of the printing machine in a well-known manner. However, photographic paper 11 is still sensitive to light when it is positioned proximate marking head 24 and is therefore susceptible to receiving marking data exposed from a light source.

To facilitate the placement of data on photographic paper 11, it is desirable to provide for controlled movement of the marking head 24. This is primarily necessary since the paper 11 moves intermittently. Drive motors 49 engage drive wheels 50 to controllably move the marking head 24 along the longitudinally relative track 52. The marking head 24 engages conveyor chain 54 which is positioned proximate track 52 and correspondingly engages drive wheels 50. Operation of the stepper drive motors 49 causes rotation of drive wheels 50 and therefore longitudinal movement of the chain 54 relative to track 52. The marking head 24 which engages a portion of chain 54, therefore, slides along track 52 as a result of the operation of motors 49. The marking head 24, through coordinated movement, can then place data on stationary paper or at a rate different from that produced by the rate of travel of the paper 11 alone.

For example, when the photographic paper 11 remains stationary, the marking head 24 can be caused to travel along track 52, placing the full dot-matrix information on the paper 11 by intermittently exposing a series of single-row dots thereon. Microcontroller 16 is operative to control the movement and operation of the marking head 24 as will be disclosed hereinafter. By coordinating the speed of movement of the marking head 24 with the interval between successive single-row images from the marking head 24 on the paper 11, a dot-matrix pattern can be exposed thereon. Further, the specific LEDs which are to be illuminated in each single-row image are controlled by the microcontroller 16 according to the paper dot-matrix pattern of the alphanumeric data to be exposed on the paper 11.

In like manner, marking head 24 could move along track 52 in the opposite direction as the movement or paper 11 to increase the speed of data transfer over that achieved by the advancement of paper 11, or movement of the marking head 24, alone. This may be useful for the transfer of a large data array, or when the paper 11 is advancing relatively slowly.

Customer order, identifying and/or processing data corresponding to the roll or strip of film from which prints are being made, or corresponding to a particular image or set of images thereon, may be transmitted to the LED array in the form of encoded data from the microcontroller prior to the printing process. The data can be any combination or set of alphanumeric characters determined by the user for identifying a particular image or set of images, and may be stored in memory associated with the microcontroller 16 until needed.

Once the photographic paper 11 has been exposed to the images on the roll of film and is advanced toward the location of marking head 24, a sensor 26 adjacent to printing head 24 may be utilized to sense the presence of the photographic paper 11 and deliver a signal to microcontroller 16. Sensor 26 may comprise any suitable type of mechanical, electrical, or electronic device capable of detecting and signaling the passage of the photographic paper 11. Accordingly, when the leading edge of the photographic paper 11 contacts or passes sensor 26, a signal will be sent to the microcontroller 16 which controls or monitors the paper movement to determine when the paper 11 is adjacent to marking head 24. As the printing paper continues past marking head 24, the relative amount of travel of paper 11 places each print or series of prints in front of marking head 24, and by continuously monitoring the amount of travel of paper 11, the microcontroller 16 can correlate specific data to a specific print image on the paper 11.

For example, sensor 26 could comprise a simple electrical switch closed by the photographic paper 11. The closing of the switch would then activate an electronic timer synchronized to the constant speed of the printing paper being fed through the machine, generating a signal when enough time had elapsed for an entire print to have passed the marking head 24. Alternatively, sensor 26 could be electrically connected to the microcontroller 16 itself, which can synchronize the placement of data by monitoring the amount of travel of photographic paper 11 and the exposure of photographic prints thereon. Sensor 26 could alternatively comprise a photocell acting in a similar manner.

Upon receipt of the signal from sensor 26 indicating the presence of a print adjacent to marking head 24, microcontroller 16 retrieves the alphanumeric data corresponding to that print. Because the data is stored sequentially, the microcontroller retrieves the first set of data entered for the first signal received, the second set of data for the second signal received, and so on. As stated previously, each signal received and each set of data entered can correspond to a particular print, a set of prints or an entire roll. However, in the illustrated embodiment each signal and each data set corresponds to an individual print of a frame of film.

The data retrieved from the memory of microcontroller 16 is sent to RS232 decoder interface 18. Interface 18 reformats the digital data received from microcontroller 16 into a sequence of dot-matrix images. Specifically, interface 18 converts each character in the set into a number of dot-matrix image arrays. The concept of dot-matrix printing and devices such as interface 18 for converting digital data representing alphanumeric characters into a set of dot-matrix signals is well-known.

As each character is converted into a set of dot-matrix signals, interface 18 operates LED array 20 in a corresponding manner, selectively enabling the individual elements in the LED array to generate the proper single row pattern for each portion of the overall dot-matrix pattern of each alphanumeric data character. These patterns of light are sequentially transmitted to the ends of optical fibers 22 in marking head 24 as the marking head 24 moves relative the paper to imprint the data on the corresponding portion on the margin of the photographic paper 11.

Figure 4:
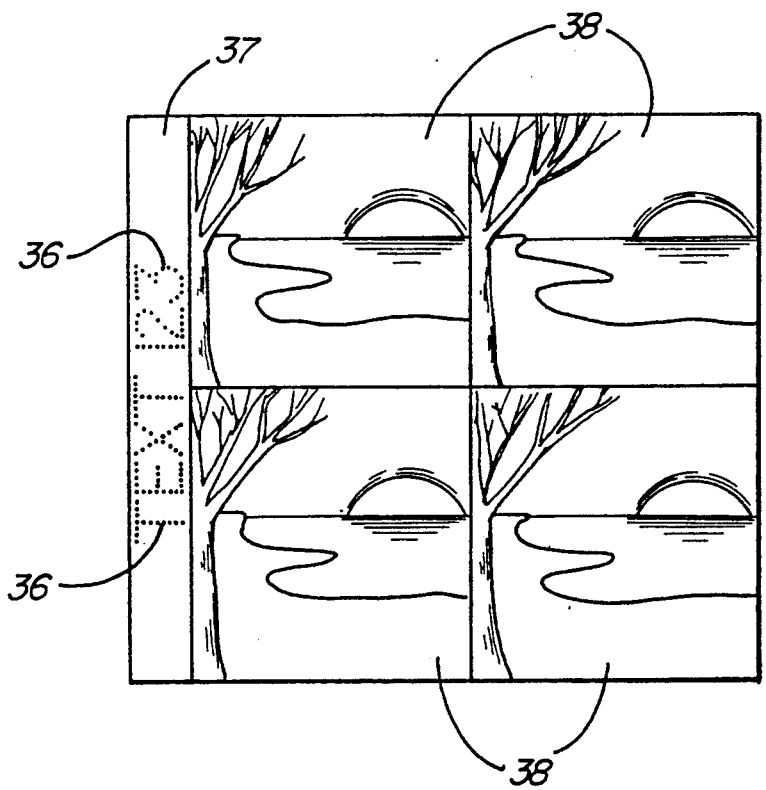
FIG. 4 illustrates a photographic print marked with alphanumeric dot-matrix data by the present invention.

The rate at which LED array 20 is enabled to generate each vertical linear array of dots will be timed to properly space each row of dots in the dot-matrix array. In this manner, marking head 24 operates sequentially, one "dot row" at a time, to produce a dot-matrix string of text on the printing paper as shown in FIG. 4. It can be seen that each character in the string comprises a number of varying dot patterns. Each of these patterns corresponds to the single-row-dot-matrix of optical fibers 22 in FIG. 2, and each dot represents a corresponding lighted optical fiber in the matrix.

The marking head 24 can be manufactured with various brackets 33 or openings 34 to properly secure the device within a photographic print making apparatus proximate the location on paper 11 to be marked.

Figure 5:
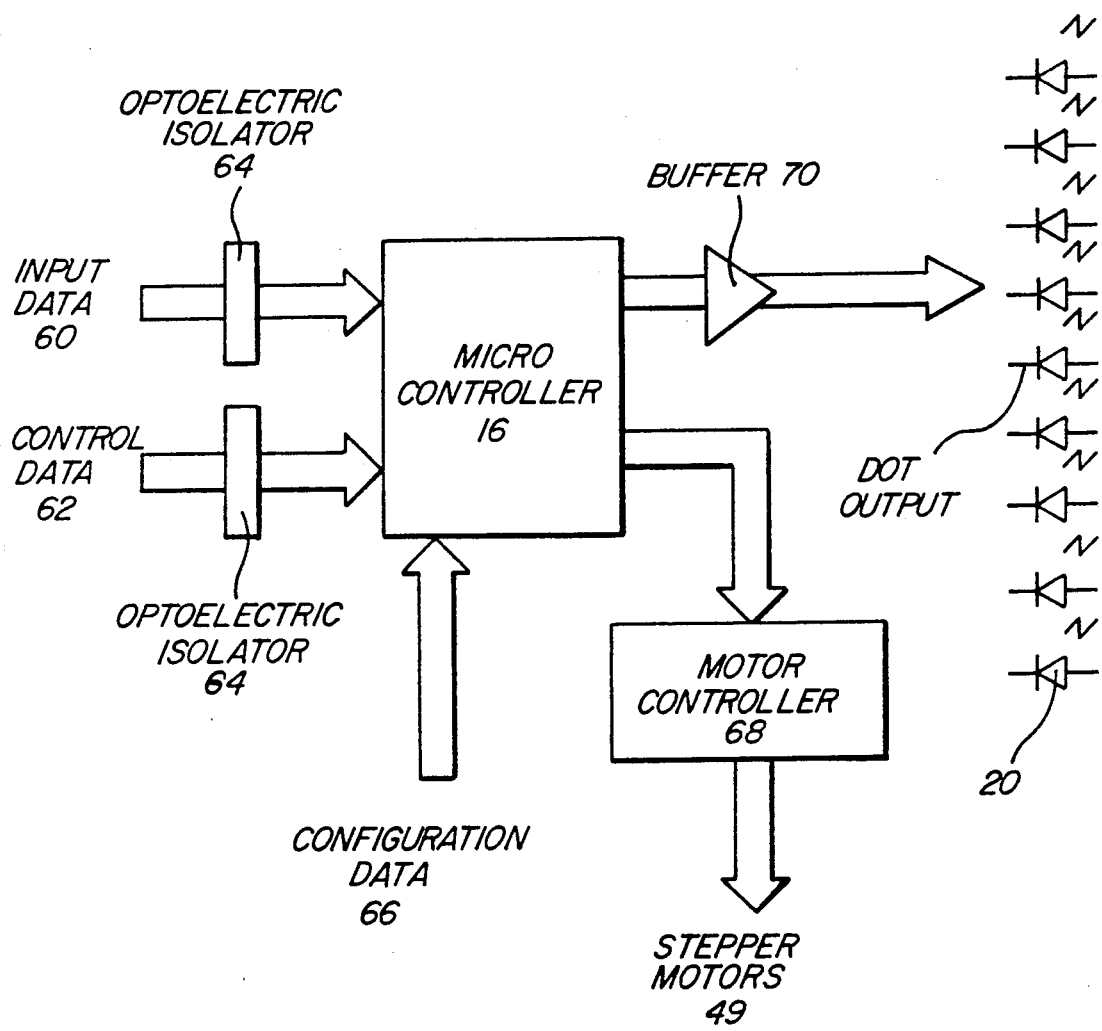
FIG. 5 is a diagram of a control system used by the present invention.

Referring also to FIG. 5, operation of the marking head 24 is preferably controlled by microcontroller 16. Input data 60 and control data 62 are sent to microcontroller 16 utilizing optoelectric isolators 64 to prevent feedback along the transmission lines. Input data 60 comprises the digital data representing the alphanumeric character output desired to be exposed proximate the photographic prints. Control data 62 comprises the additional data necessary to print, such as data regarding photographic paper movement, marking head movement, or the like. Configuration data 66 is also sent to the microcontroller 16 to correlate the marking head 24 to different types of photographic printing machine 10 for retrofit thereon. Configuration data 66 can include printer specific data such as voltage outputs, paper feed speeds, etc.

The microcontroller 16 uses the data received to control the dot output of the marking head 24 and the motors 49 for moving the marking head 24. The microcontroller 16 signals the motor controller 68 to engage the stepper motors 49 at the same time that the microcontroller 16 signals the LEDs 20 to create a dot output pattern. The transmission line for the LEDs 20 includes a buffer 70 to prevent feedback to the microcontroller 16. The microcontroller 16 thereby coordinates the movement of the marking head 24 to the dot output of the LEDs 20 by controlling the use of motors 49 in relation to the time for each linear row of dot output to produce a dot matrix character string.

Referring also to FIG. 4, a sample string of dot-matrix text 36 is shown printed on the margin 37 proximate a finished print or prints 38 in accordance with the present invention. In the illustrated embodiment the text has been printed on the border of the print paper to avoid marring the photographic image. However, it will be understood that the dot-matrix data may be printed anywhere desired on the print.

It can be seen that the marking device is not limited to using LEDs as a source of light. An array of isolated light bulbs, or other light sources could be utilized instead. The sole performance criteria being the ability to individually generate light, isolated from the other light sources in the array during output.

The foregoing description is of an illustrated embodiment and is not intended to be limiting, as many various and modifications of the present invention within the scope of the appended claims will be apparent to those skilled in the art.

I claim:

1. A photographic apparatus for exposing visible marks on the emulsion side of photographic paper during exposure of photographic prints thereon, comprising:

a photographic printing machine;
photographic paper;
an optical marker operative to move relative said paper and having a plurality of light source elements and a corresponding plurality of optical fibers, each fiber having one end disposed proximate to a respective one of said light source elements to receive light therefrom and having the other end configured to transmit light from said light source onto said paper, and control means for activating said optical marker and coordinating movement of said marker relative said paper to create a series of individual visible marks associated with said prints in a predetermined pattern.

2. The apparatus of claim 1, wherein said control means operates to move said optical marker when said photographic paper is stationary to create a series of visible marks associated with said prints.

3. The apparatus of claim 1, wherein said control means operates to move said optical marker at a first rate of travel when said photographic paper moves at a second rate of travel, different from said first rate of travel, to create a series of visible marks associated with said prints.

4. The apparatus of claim 1, wherein said optical marker sequentially exposes multiple linear arrays of marks, which, in combination, amount to said predetermined pattern.

5. The apparatus of claim 1, wherein said light source elements are light emitting diodes.

6. A photographic apparatus for exposing visible marks on the emulsion side of the photographic paper as it is processed with photographic prints, comprising:
 a photographic printing machine;
 photographic paper;
 a microcontroller in said printing machine for storing data corresponding to prints being processed in said printing machine;
 data-entry means for entering said data into said microcontroller;
 a plurality of light sources connected to said microcontroller for displaying said data as a dot-matrix pattern of light;
 an optical marker head movably mounted adjacent said prints being processed;
 means for moving said optical marker head relative said paper;
 a plurality of optical fibers connected at one end to said plurality of light sources to receive light therefrom and at the other end to said optical marker head, whereby said optical fibers in said optical marker head operate to transmit the light signals from said light sources onto said prints in a predetermined dot-matrix pattern.

7. The apparatus of claim 6, wherein said optical marker moves and said photographic paper remains stationary to create a series of visible marks associated with said prints.

8. The apparatus of claim 6, wherein said optical marker moves at a first rate of travel and said photographic paper moves at a second rate of travel, different from said first rate of travel, to create a series of visible marks associated with said prints.

9. The apparatus of claim 6, wherein said optical fibers are arranged in a linear array in said marker head, whereby said apparatus sequentially exposes multiple linear arrays of marks, which, in combination, amount to said predetermined pattern.

10. The apparatus of claim 6, wherein said light source elements are light emitting diodes.

11. A photographic apparatus for placing visible marks on photographic paper as it is processed with photographic prints, comprising:
 an automated photographic printing machine in which a continuous strip of printing paper is fed along the processing path at a predetermined rate;
 microcontroller means in said printing machine for storing alphanumeric data corresponding to prints being processed in said machine;
 data-entry means for entering said data into the memory of said microcontroller;
 an LED display mounted in said printing machine;
 interface means connected to said microcontroller and said LED display for receiving said data stored in said microcontroller and selectively activating said LED display to generate a series of predetermined dot-matrix light patterns corresponding to said alphanumeric data;
 an optical marker head located proximate said photographic paper;
 means for moving said optical marker relative said paper; and
 a plurality of optical fibers connected at one end to said LED display to receive light therefrom, and at the other end to said optical marker head; wherein, said optical fibers are arranged in said optical marker head in a single-row, dot-matrix array to transmit said predetermined dot-matrix light patterns from said LED display onto said prints as they pass said optical marker head.

12. The apparatus of claim 11, wherein said optical marker moves at a first rate of travel and said photographic paper moves at a second rate of travel, different from said first rate of travel, to create a series of visible marks associated with said prints.

13. The apparatus of claim 11, wherein said optical marker sequentially exposes multiple linear arrays of marks, which, in combination, amount to said predetermined pattern.

* * * * *

UNITED STATES PATENT AND TRADEMARK OFFICE
CERTIFICATE OF CORRECTION

PATENT NO. : 5,093,682
DATED : March 3, 1992
INVENTOR(S) : Ray Hicks It is certified that error appears in the above-identified patent and that said Letters Patent is hereby corrected as shown below:

Column 3, line 41, delete "optic" and insert --optical--;

Column 3, line 55, delete "cavity 32" and insert --cavity 29--;

Column 5, line 61, delete "paper to" and insert --paper to--;

Signed and Sealed this

Nineteenth Day of October, 1993

Attest:

BRUCE LEHMAN

*Attesting Officer*  *Commissioner of Patents and Trademarks*